July 11, 1944.  P. E. HASSETT  2,353,561
COUPLING SLEEVE FOR TUBULAR PILING
Filed Dec. 23, 1942
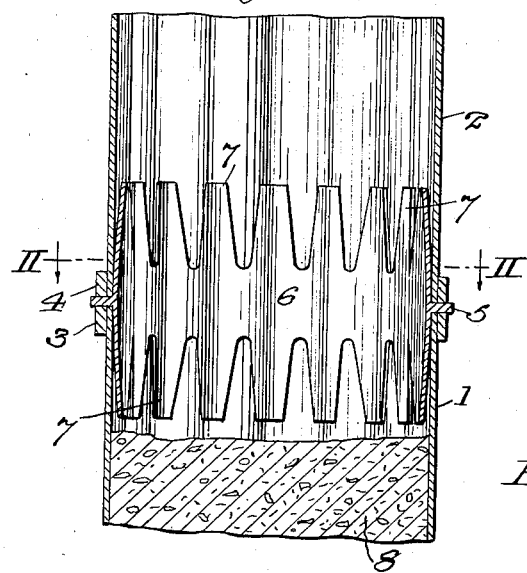
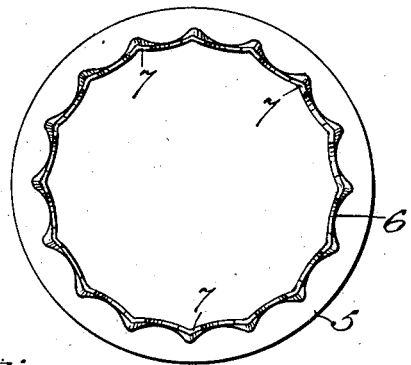
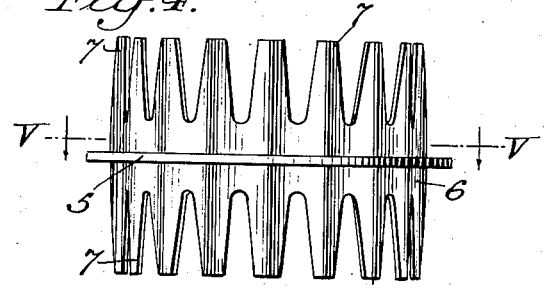
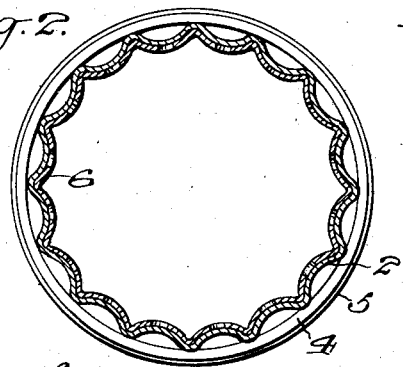
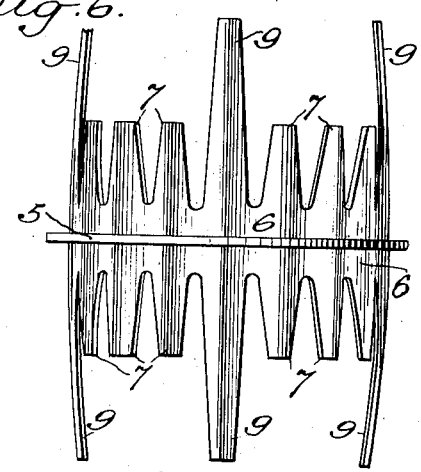
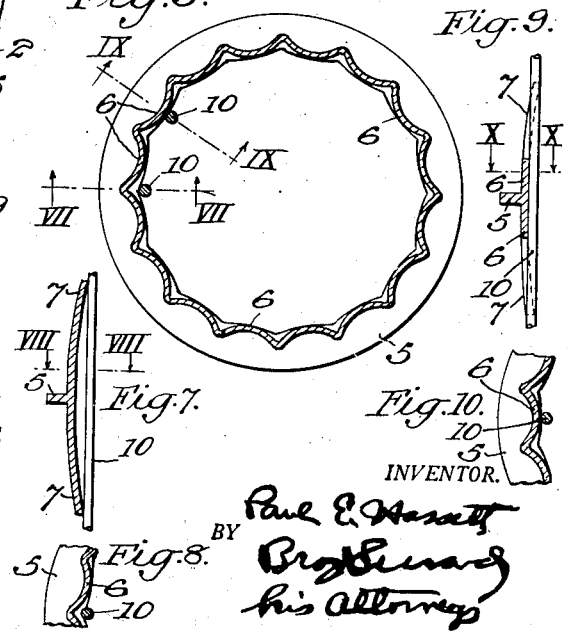
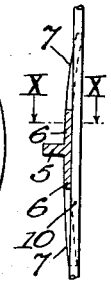
INVENTOR.
Paul E. Hassett
BY Bro Brand
his Attorney Patented July 11, 1944

2,353,561

UNITED STATES PATENT OFFICE 2,353,561

COUPLING SLEEVE FOR TUBULAR PILING

Paul E. Hassett, Farmington, Conn., assignor, by mesne assignments, to MacArthur Concrete Pile Corporation, New York, N. Y., a corporation of New York Application December 23, 1942, Serial No. 469,941

10 Claims. (Cl. 285—192)

This invention relates to a coupling sleeve for tubular piling and has for an object to provide such a device which is adapted to promote the rapid and efficient coupling or union of successive sections of tubular piling as the latter are driven to their intended positions.

Another object is to provide such a coupling which will readily adapt itself to entry into the adjacent ends of pile sections even though the latter may vary slightly in cross sectional dimensions or be brought toward each other while slightly out of precise alignment.

Another object is to provide such a coupling which is so shaped as freely to enter the adjacent ends of pile sections while providing a substantially liquid tight fit or union when the sections are brought into abutting position.

Another object is to provide such a coupling which is particularly adapted for cooperation with fluted or longitudinally corrugated piling and insures the union of such piling sections with the flutings therein in correct longitudinal alignment and with a substantially liquid tight joint established between the sections.

Another object is to provide such a coupling which is adapted for use in the driving of sectional tubular piling without requiring the employment of any apparatus or tools other than the driving mechanism.

Another object is to provide such a coupling which, while establishing a strong and substantially liquid tight joint between the piling sections, does not, to any substantial degree, impede or hamper the filling of the piling with concrete after the piling has been driven.

Another object is to provide such a coupling which not only cooperates with the piling sections in forming the union or joint but also cooperates with the concrete in reinforcing the joint and increasing the rigidity thereof.

Another object consists in providing such a coupling which is simple to manufacture; which may readily be standardized for use with standardized tubular piling; and which does not require any especial skill in its use during the pile driving operation.

Another object consists in providing such a coupling which will establish a firm and rigid joint having great resistance to lateral pressures or strains such as arise especially when the piling is driven and used in a position at an angle to the vertical.

A further object consists in providing certain improvements in the form and construction of the coupling whereby the above named objects and others may effectively be attained.

Practical embodiments of my invention are shown in the accompanying drawing, in which Fig. 1 represents a detail vertical central section showing the coupling in use establishing a union between two fluted piling sections partly filled with concrete;

Fig. 2 represents a complete horizontal section taken in the plane of the line II—II of Fig. 1, looking in the direction of the arrows;

Fig. 3 represents a top plan view of the coupling by itself;

Fig. 4 represents a side elevation thereof;

Fig. 5 represents a section taken in the plane of the line V—V of Fig. 4, looking in the direction of the arrows; and showing a slightly modified form of the invention;

Fig. 6 represents a side elevation of a second modified form;

Fig. 7 represents a detail vertical section taken in the plane of the line VII—VII of Fig. 5;

Fig. 8 represents a detail horizontal section taken in the plane of the line VIII—VIII of Fig. 7;

Fig. 9 represents a detail vertical section taken in the plane of the line IX—IX of Fig. 5; and Fig. 10 represents a detail horizontal section taken in the plane of the line X—X of Fig. 9.

It is common to form tubular metallic piling with longitudinal flutes or corrugations and to drive the same, with a pile driver, into the earth, section after section. These sections may be quite long but it very frequently requires the use of two or more sections before a single piling is driven or set to the desired depth. It has been common practice to unite a succeeding section to a preceding one by telescopically inserting the lower end of the succeeding section into the upper end of the preceding one; the joint thus formed being thereafter secured by electric welding including both spot welding and continuous welding.

In practice, this jointing of the sections generally takes place after a preceding section has been driven until its upper end is only a few feet above ground and, thereafter, the driving is continued by hammering with a pile driver upon the upper end of the succeeding section, which hammering, of course, puts a heavy strain upon the electrically welded joint, and also tends to rupture the upper end of the preceding section by the wedging action of the lower end of the succeeding section. It should also be remarked that the step of electric welding above described is comparatively expensive in equipment and time and requires a high degree of skill for uniform success. The time cost involved in delaying the driving while the welding takes place is, of itself, an important factor from the point of view of economy.

In proceeding with utilization of my invention, the first piling section is driven as above described; the coupling sleeve is set in the upper end of the said section; the succeeding piling section is set upon the preceding one with the upper end of the coupling sleeve in the lower end of the succeeding section; and the pile driver operates upon the upper end of the succeeding section, which forces the two sections of the coupling sleeve into a substantially liquid tight joint and drives the combined sections downwardly into the ground. It is believed that the simplicity of this procedure as contrasted with the prior procedure above described will be evident.

Turning now to a detailed description of my invention, two sections of fluted or corrugated hollow metal piling are shown in part marked 1 and 2, and each section may be provided at its end with a surrounding reinforcing collar 3, 4 welded, or otherwise suitably secured, thereto. These piling sections 1, 2, are represented as of the same cross sectional size but they may, if desired, differ slightly in this respect.

The coupling sleeve constituting my invention comprises an annular flange 5, preferably composed of metal, which surrounds and is welded, or otherwise suitably secured, to a body portion or sleeve denoted generally by 6. This sleeve is fluted or corrugated so as to make its cross sectional configuration conform to that of the piling sections 1, 2, and it is of such size that its outer periphery adjacent the flange 5 will have a close driving fit within the piling sections 1 and 2 so that, when the parts are in the position illustrated in Fig. 1, a substantially liquid tight joint is established.

Both the upper and lower ends or edges of the coupling body portion 6 are formed with teeth or prongs 7, the openings or spacings between which preferably do not extend all the way to the flange 5 so as to leave, on each side of the said flange, continuous portions of the body 6 which, in effect, form webs between the teeth 7. The said teeth have a cross sectional form fitted to lie snugly within the flutings of the piling sections, and they are preferably circumferentially tapered so as to lead them into position within said flutings when the piling sections are joined and to allow for slight differences in cross sectional size of the said sections.

The circumferential size of the upper and lower edges of the teeth 7, considered as a whole, is preferably somewhat less than the size of the body portion 6 adjacent the flange 5, as clearly shown in Figs. 1 and 4. This formation of the body or sleeve 6 facilitates entry of the sleeve into the piling sections 1, 2 thereby simplifying the step of uniting the piling sections in practice.

In operation, the piling section 1 is driven into the ground until its upper end protrudes a predetermined distance, e. g. a few feet, above the surface of the ground. The coupling sleeve is then set into the upper end of the piling section 1; after which the piling section 2 is placed in position with its lower end surrounding the upper portion of the coupling sleeve. Ordinarily this positioning of the piling section 2 will leave the ends of the sections 1 and 2 a slight distance apart. The pile driver or the like then hammers upon the upper end of the piling section 2 until it is driven into the position shown in Fig. 1, in which position a substantially fluid tight joint is established because of the close engagement between the sections 1 and 2 and the sides of the body portion 6 and flange 5 of the coupling sleeve. The driving is then continued and this coupling or joining operation is repeated conforming to the number of piling sections required, after which the completely driven pile may be filled with concrete 8 according to well understood practice.

It will be observed that the relative size and shape of the coupling sleeve impart to it the desired characteristics above mentioned, as well as others inherent in its structure; and it may here be noted that the separation of the teeth 7 from each other gives them a certain capacity for yielding or bending which renders the coupling sleeve eminently suited to adjusting itself to slight irregularities or variations in the size or form of the piling sections. Furthermore, the shape or conformation of the said teeth causes the coupling sleeve to have a capacity of interengagement with the hardened concrete so as materially and advantageously to increase the strength, rigity, permanence, and resistance of the union or joint between the piling sections.

The modified form of coupling sleeve shown in Fig. 6 is the same as the form already described, except that certain of the teeth are extended in length as indicated at 9. This modification is highly desirable when piling is to be driven at an angle to the vertical and has to resist heavy lateral pressures or stresses when in use.

The modified form shown in Figs. 5, 7 and 8 is intended to have substantially the same functional capacity as the form shown in Fig. 6 but, instead of extending certain of the teeth as represented by 9 in Fig. 6, the modified form of Figs. 5, 7 and 8 has rods 10 welded, or otherwise suitably secured, to the interior of the sleeve with the ends of the rods projecting a desired distance beyond the teeth 7. The extent of this projection may, for instance, be comparable to that of the teeth 9 in Fig. 6. While Fig. 5 illustrates only two of the rods 10, it should be stated that the invention contemplates the use of several of said rods such, for instance, as four or five substantially equally spaced around the interior of the sleeve.

The modified form represented in Figs. 5, 9 and 10 is the same as the form illustrated in Figs. 5, 7 and 8 except that, in the form of Figs. 5, 9 and 10, the rods 10 are located in such positions that their outer portions lie between teeth 7 which enables the rods to have their intermediate portions closely adjacent to the interior of body portion 6 of the sleeve, to which portion the rods may be welded or otherwise suitably secured. In this case also an appropriate number, such as four or five, of the rods 10 are intended to be substantially equally spaced around the inner circumference of the sleeve.

As previously indicated, the coupling sleeve is preferably composed of metal, and it may be formed by a stamping and rolling operation and the flange 5 suitably secured in position. Again, if desired, the coupling, together with the said flange, may be cast in one piece. These suggestions of ways of producing this device are not, however, intended to be exclusive as it may be manufactured according to individual preference and following any appropriate known procedure.

In case conditions should indicate, or preference elect, the openings or spacings between the teeth 7 may be omitted while still shaping the sleeve so that its upper and lower edges are circumferentially somewhat smaller than the body portion 6 adjacent the flange 5. Such a form of sleeve may probably be most conveniently and practically formed by a casting procedure because of the circumferential variations just mentioned.

It will be understood that various changes may be made in the form, construction, material and arrangement of the elements of my coupling sleeve without departing from the spirit and scope of this invention. Hence I do not intend to be limited to the details herein shown and described except as they may be included in the claims.

What I claim is:

1. A coupling sleeve for hollow fluted piling comprising, a body shaped to lie within the piling and conforming substantially to the contour thereof, said body having a circumferentially continuous intermediate portion and circumferentially interrupted end portions, said end portions being fashioned to form circular series of fluted teeth.

2. A coupling sleeve for hollow piling comprising, a body having a circumferentially continuous intermediate portion and projections extending in both directions from said intermediate portion, certain of said projections being longer than the others for increasing the resistance of the coupling sleeve to lateral stresses.

3. A coupling sleeve for hollow piling comprising, a body having a circumferentially continuous intermediate portion and circumferentially interrupted end portions, said end portions being fashioned to form circular series of circumferentially tapered teeth, certain of said teeth being longer than the others for increasing the resistance of the coupling sleeve to lateral stresses.

4. A coupling sleeve for hollow piling comprising, a body having a circumferentially continuous intermediate portion and circumferentially interrupted end portions, said end portions being fashioned to form circular series of teeth, certain of said teeth being longer than the others for increasing the resistance of the coupling sleeve to lateral stresses, the circumferential size of said longer teeth considered as a whole being less than the circumferential size of the intermediate portion, and the circumferential size of the other teeth considered as a whole being greater than the circumferential size of said longer teeth considered as a whole and less than the circumferential size of said intermediate portion.

5. A coupling sleeve for hollow piling comprising, a body having a circumferentially continuous intermediate portion and projections extending in both directions from said intermediate portion, certain of said projections being longer than the others for increasing the resistance of the coupling sleeve to lateral stresses and being formed by elements secured to the intermediate portion.

6. A coupling sleeve for hollow piling comprising, a body having a circumferentially continuous intermediate portion and projections extending in both directions from said intermediate portion, certain of said projections being longer than the others for increasing the resistance of the coupling sleeve to lateral stresses and being formed by elements secured to the interior of the intermediate portion.

7. A coupling sleeve for hollow piling comprising, a body having a circumferentially continuous intermediate portion and circumferentially interrupted end portions, said end portions being fashioned to form circular series of teeth, and elements secured to the interior of said intermediate portion and projecting beyond said teeth for increasing the resistance of the coupling sleeve to lateral stresses.

8. A coupling sleeve for hollow piling comprising, a body having a circumferentially continuous intermediate portion and circumferentially interrupted end portions, said end portions being fashioned to form circular series of teeth, and elements secured to the interior of said intermediate portion and lying between and projecting beyond said teeth for increasing the resistance of the coupling sleeve to lateral stresses.

9. A coupling sleeve for hollow fluted piling comprising, a body shaped to lie within the piling and conforming substantially to the contour thereof, said body having a circumferentially continuous intermediate portion and circumferentially interrupted end portions, the circumferential size of said end portions being less than the circumferential size of the intermediate portion, and a flange surrounding said intermediate portion.

10. A coupling sleeve for hollow fluted piling comprising, a body shaped to lie within the piling and conforming substantially to the contour thereof, said body having a circumferentially continuous intermediate portion and circumferentially interrupted end portions, said end portions being fashioned to form circular series of teeth, certain of said teeth being longer than the others for increasing the resistance of the coupling sleeve to lateral stresses, the circumferential size of said longer teeth considered as a whole being less than the circumferential size of the intermediate portion, and the circumferential size of the other teeth considered as a whole being greater than the circumferential size of said longer teeth considered as a whole and less than the circumferential size of said intermediate portion.

PAUL E. HASSETT.